United States Patent
Fischer

(10) Patent No.: US 10,443,691 B2
(45) Date of Patent: Oct. 15, 2019

(54) TENSIONING DEVICE FOR A CHAIN DRIVE

(71) Applicant: Schaeffler Technologies AG & Co. KG, Herzogenaurach (DE)

(72) Inventor: Markus Fischer, Hessdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 111 days.

(21) Appl. No.: 15/540,349

(22) PCT Filed: Jan. 14, 2016

(86) PCT No.: PCT/DE2016/200011
§ 371 (c)(1),
(2) Date: Jun. 28, 2017

(87) PCT Pub. No.: WO2016/112907
PCT Pub. Date: Jul. 21, 2016

(65) Prior Publication Data
US 2017/0356528 A1    Dec. 14, 2017

(30) Foreign Application Priority Data
Jan. 16, 2015  (DE) .................. 10 2015 200 606

(51) Int. Cl.
*F16H 7/08* (2006.01)
*F16K 17/04* (2006.01)

(52) U.S. Cl.
CPC .......... *F16H 7/08* (2013.01); *F16K 17/0413* (2013.01); *F16H 2007/0806* (2013.01);
(Continued)

(58) Field of Classification Search
CPC .............. F16H 7/08; F16H 2007/0863; F16H 2007/0891; F16H 2007/0814; F16K 17/04
(Continued)

(56) References Cited

U.S. PATENT DOCUMENTS 5,707,309 A * 1/1998 Simpson .................. F16H 7/08
474/110
6,193,623 B1    2/2001 Koch et al.
(Continued)

FOREIGN PATENT DOCUMENTS

DE      19780804      4/2006
DE    102005051480    5/2006
(Continued)

OTHER PUBLICATIONS

International Search Report of PCT/DE2016/200011, dated Mar. 23, 2016, 3 pages.

Primary Examiner — Michael R Mansen
Assistant Examiner — Mark K Buse
(74) Attorney, Agent, or Firm — Davidson, Davidson & Kappel, LLC

(57) ABSTRACT

A hydraulic tensioning device for a chain device, having a housing and having a clamping piston guided displaceably in a housing bore of the housing, the clamping piston having a piston cavity with a hardened inner circumferential surface, and also having a pressure relief valve unit arranged in the piston cavity. The pressure relief valve unit (12) is a preassemblable unit and includes a spring (18), a closing body (17) and a valve seat (16) and also a receptacle (15, 26) at least partially enclosing the valve seat (16), wherein the valve seat (16) is made of a metal material, has an at least partially hardened surface and wherein the receptacle (15, 26) forms a press-fit with the inner circumferential surface of the clamping piston (3).

5 Claims, 2 Drawing Sheets

(52) U.S. Cl.
CPC ............... *F16H 2007/0814* (2013.01); *F16H 2007/0859* (2013.01); *F16H 2007/0863* (2013.01); *F16H 2007/0891* (2013.01)

(58) Field of Classification Search
USPC .......................................................... 474/110
See application file for complete search history.

(56) References Cited

U.S. PATENT DOCUMENTS

| | | | | |
|---|---|---|---|---|
| 6,234,928 | B1* | 5/2001 | Suzuki | F01L 1/02 |
| | | | | 474/101 |
| 6,322,468 | B1* | 11/2001 | Wing | F16H 7/08 |
| | | | | 474/109 |
| 7,174,799 | B2 | 2/2007 | Yoshida et al. | |
| 8,221,274 | B2* | 7/2012 | Sato | F16H 7/0836 |
| | | | | 474/109 |
| 9,556,963 | B2 | 1/2017 | Hartmann et al. | |
| 2004/0087399 | A1* | 5/2004 | Hayakawa | F01L 1/02 |
| | | | | 474/110 |
| 2004/0266571 | A1* | 12/2004 | Izutsu | F16H 7/0848 |
| | | | | 474/110 |
| 2006/0003859 | A1* | 1/2006 | Sato | F16H 7/0836 |
| | | | | 474/110 |
| 2008/0090685 | A1 | 4/2008 | Namie et al. | |
| 2010/0087285 | A1* | 4/2010 | Sato | F16H 7/0836 |
| | | | | 474/110 |
| 2012/0024249 | A1* | 2/2012 | Fuhrmann | F01L 1/024 |
| | | | | 123/90.57 |
| 2013/0017913 | A1 | 1/2013 | Hartmann | |
| 2013/0260930 | A1* | 10/2013 | Kurematsu | F16H 7/08 |
| | | | | 474/110 |
| 2013/0303319 | A1* | 11/2013 | Fischer | F16H 7/08 |
| | | | | 474/110 |
| 2016/0327135 | A1* | 11/2016 | Fischer | F16H 7/0836 |

FOREIGN PATENT DOCUMENTS

| | | |
|---|---|---|
| DE | 102007038748 | 2/2009 |
| DE | 102007053129 | 5/2009 |
| DE | 102011079184 A1 | 1/2013 |
| DE | 102012216056 | 3/2014 |
| DE | 102012218891 | 4/2014 |
| DE | 102013225984 A1 | 6/2015 |

* cited by examiner

TENSIONING DEVICE FOR A CHAIN DRIVE

The present invention relates to a hydraulic tensioning device for a chain drive of an internal combustion engine. Chain drives generally include a drive chain wheel that is connected to the crankshaft, an output chain wheel that is connected to a camshaft, and a control chain that connects the drive chain wheel to the output chain wheel. The drive torque of the crankshaft is transmitted to the camshaft via the tight span of the drive control chain. The control chain is tensioned at its slack span in order to be able to ensure its functionality over the operating period. For this purpose, the control chain is acted on by a force with the aid of a tensioning device.

BACKGROUND

DE 10 2011 079 184 A1 provides a hydraulic tensioning device for an internal combustion engine. The device includes a housing and a hollow piston which is movable in the housing, and which together with the housing delimits a pressure chamber. Situated within the hollow piston is a pressure relief valve, with the aid of which the pressure within the pressure chamber may be limited to a predetermined value. The pressure relief valve is a preassemblable unit made up of a valve housing, a valve cover, a valve body, and a valve spring, the valve housing and the valve cover being made of plastic. The pressure relief valve is pressed into the hollow piston. In some applications, it may be necessary to increase the resistance of the pressure relief valve unit to cavitation effects.

Another pressure relief valve assembly is provided in subsequently published DE 10 2013 225 984 A1. A cup-like valve housing is provided, which is held in a cylindrical receptacle in a piston of a hydraulic chain tensioning device with the aid of a press fit. A guide element is inserted into a central stepped bore of the valve housing, and on the outer side forms a closed rim whose end area is inserted into an annular groove in the valve housing. On the inner side, the guide element forms a valve seat having a central opening that is closable by a spring-loaded valve plate. For fixing the guide element in the valve housing, a protruding shoulder of the valve housing is radially inwardly deformed, resulting in a ridge. The ridge is fitted into a circumferential step of the guide element in a form-locked manner.

SUMMARY OF THE INVENTION

It is an object of the present invention to provide a tensioning device whose preassemblable pressure relief valve unit has durable properties, and which at the same time may be cost-effectively manufactured and installed.

The present invention provides a hydraulic tensioning device for a chain drive of an internal combustion engine, including a housing and a clamping piston displaceably guided in a housing bore of the housing, the clamping piston having a piston cavity with at least one hardened inner circumferential surface, the piston cavity together with the housing bore of the housing forming a pressure chamber, and including a pressure relief valve unit that is situated in the piston cavity. The pressure relief valve unit is a preassemblable unit, and includes a spring, a closing body, and a valve seat, as well as a receptacle that at least partially encloses the valve seat, the valve seat being made of a metallic material and at least having an at least partially hardened surface, the receptacle forming a press fit with the inner circumferential surface of the clamping piston, and the receptacle forming a press fit with the valve seat.

Excessive stress on the pressure relief valve may result in material damage, thus impairing the durability of its properties. Cavitation, which may develop at the valve seat due to the quickly outflowing hydraulic medium, may in particular stress the material, for example. To avoid material damage, it is provided according to the present invention for at least the surface of the valve seat to be at least partially hardened. The valve seat, as well as the clamping piston, may also have a completely hardened design. However, this results in a conflict with the additional requirement of allowing cost-effective manufacture and installation of the preassemblable pressure relief valve unit.

According to the findings of the present invention, this conflict may be resolved by at least partially enclosing the valve seat by the receptacle, which preferably has a sleeve- or cup-shaped design, and by the receptacle forming a press fit with the inner circumferential surface of the clamping piston. Direct contact between the hardened valve seat and the hardened inner circumferential surface of the piston is avoided.

However, the pressure relief valve is still preassemblable as an assembly, and at the same time is cost-effective to manufacture. The valve seat may be inserted, for example, as one piece into the receptacle, so that the spring (a coil spring, for example) and the closing body (a valve ball or a valve plate, for example) are captively held within the pressure relief valve unit. The valve seat may additionally form a support surface for the main spring at the front side of the valve seat facing the pressure chamber. The main spring is situated in the pressure chamber, and is directly or indirectly supported against a surface of the housing on the one hand and a surface of the piston on the other hand.

A particularly favorable option for creating a press fit between the piston and the pressure relief valve unit is provided by the receptacle being made of a plastic or a metallic, nonhardened material.

In one extremely advantageous embodiment with regard to the manufacturing costs, the clamping piston is manufactured as a formed part. One advantage of this specific embodiment is that the inner circumferential surface of the clamping piston requires no metal finishing after being manufactured by forming. In particular, no machining of the inner circumferential surface of the clamping piston, which is preferably designed as a deep-drawn or extruded part, is necessary. The introduction of a receptacle having a non-hardened surface allows more flexible tolerances, despite forming a press fit between components that have a hardened surface. The manufacturing costs of the tensioning device are reduced. In one specific design, the clamping piston is manufactured as an extruded part.

A particularly advantageous design with regard to the manufacturing costs is made possible by one specific embodiment in which the ends of the pressure relief valve unit define an inflow-side end and an outflow-side end, the receptacle at the outflow-side end having a recess and a surface for supporting the spring, and the receptacle accommodating the valve seat via the inflow-side end. The number of required components may be reduced in this way. The pressure relief valve unit may be tailored to the particular application, with an otherwise identical design, by adapting the properties of the spring to the requirements that are imposed. The elastic force determines the predefined pressure to which the pressure chamber is limited. In one specific design, the valve seat has a recess and a sealing surface for the closing body on the inflow-side end.

One particularly preferred specific embodiment of the press fit provides that the receptacle has a profile that extends radially inwardly, radially outwardly, or in both directions along its circumference. The advantage of this contour, which is wave-like, for example, is that fluctuations in the dimensions, which may result in particular from dispensing with metal finishing, may be compensated for.

In another advantageous specific embodiment, the tensioning device is used in a chain drive for an internal combustion engine, including a drive chain wheel and an output chain wheel as well as a control chain, the control chain coupling the drive chain wheel and the (at least one) output chain wheel, and the control chain being tensioned with the aid of a tensioning device. Sudden tightening of the slack span may result in excessive stress on the control chain. Particular advantages of the specific embodiment are that the tensioning device reduces negative effects of sudden tightening, and has durable properties over the service life.

BRIEF DESCRIPTION OF THE DRAWINGS

The present invention is now explained in greater detail based on exemplary embodiments, with reference to the drawings. Functionally equivalent elements of the described specific embodiments are denoted by the same reference numerals.

DETAILED DESCRIPTION

Figure 1:
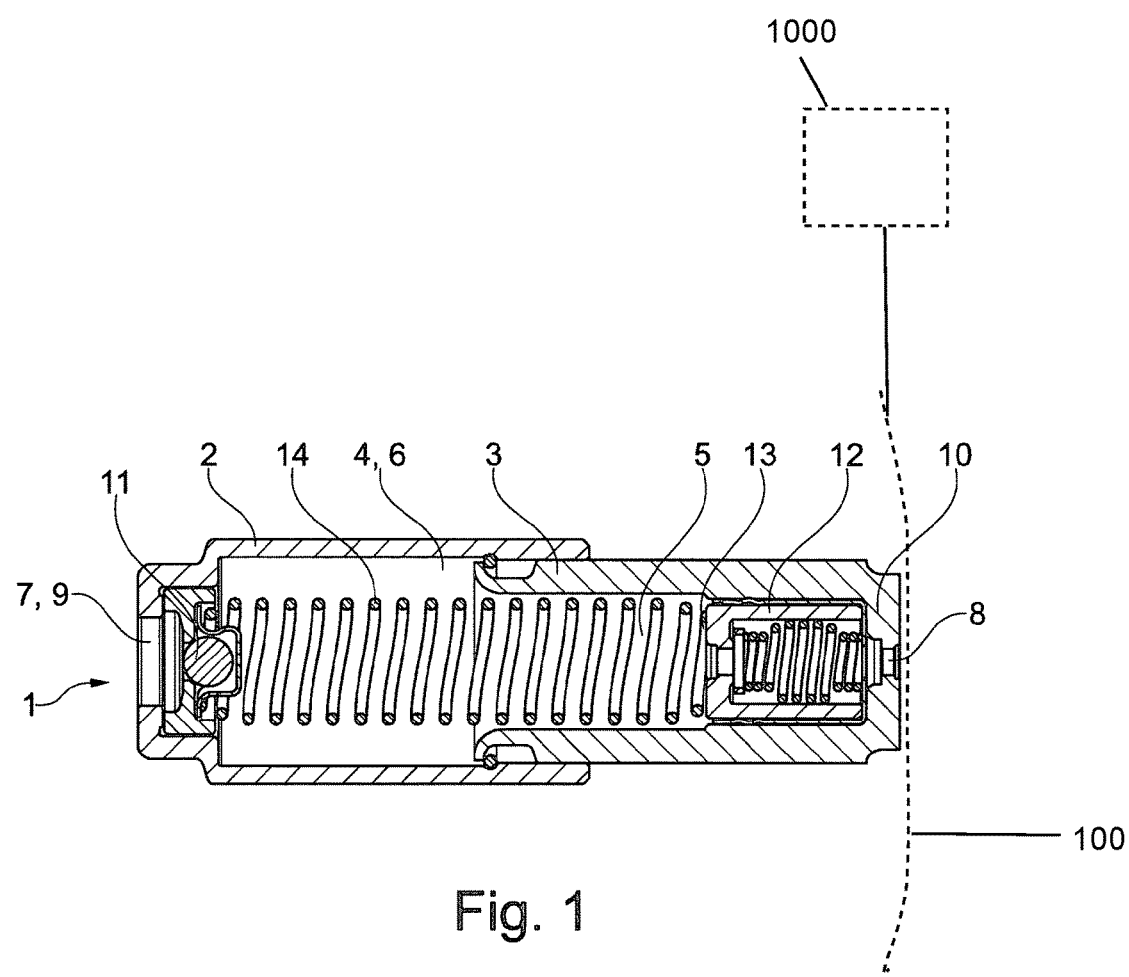
FIG. 1 shows a hydraulic tensioning device in a longitudinal section.

FIG. 1 shows a hydraulic tensioning device 1 for a chain drive of an internal combustion engine 1000 shown schematically in a longitudinal section. A chain drive includes a drive chain wheel that is connected to the crankshaft, an output chain wheel that is connected to a camshaft, and a control chain 100 shown schematically that connects the drive chain wheel to the output chain wheel. The drive torque of the crankshaft is transmitted to the camshaft via the tight span of the drive control chain. The control chain is tensioned at its slack span to be able to ensure its functionality over the operating period. For this purpose, the control chain is acted on by a tension force with the aid of the tensioning device.

Hydraulic tensioning device 1 is made up of a housing 2, and a clamping piston 3 that is axially displaceably guided in a housing bore 4 of housing 2. Clamping piston 3 is designed with a piston cavity 5, which together with the housing bore of the housing forms a pressure chamber 6. A recess 7 is situated at the end of housing 2 opposite from the opening for the receptacle of clamping piston 3. The inflow of hydraulic medium into the pressure chamber takes place via recess 7. A further recess 8 is situated at the end of clamping piston 3 that is remote from housing 2, via which a portion of the hydraulic medium may flow out. The ends form inflow-side end and outflow-side end 9, 10, respectively, of the tensioning device.

A check valve 11 is situated within pressure chamber 6, at inflow-side end 9 of tensioning device 1, and releases the hydraulic medium flow in the inflow direction and prevents the outflow from pressure chamber 6. A pressure relief valve unit 12 is situated within piston cavity 5, at outflow-side end 10 of the tensioning device. The pressure relief valve unit together with the hardened inner circumferential surface of clamping piston 3 forms a press fit, the clamping piston being designed as an extruded part. The pressure relief valve unit also includes a seat 13 for a main spring 14, whose pretensioning force on the one hand acts on housing 2, which is fixedly connected to a component of the internal combustion engine (not shown), and whose pretensioning force on the other hand acts on clamping piston 3, whose outflow-side end rests against a tensioning rail of a chain drive (not shown).

Such tensioning devices 1 for the chain drive of an internal combustion engine are used for tensioning the control chain (not shown) and attenuating vibrations that occur in the chain drive. For this reason, housing bore 4 of housing 2 and piston cavity 5 of clamping piston 3 form pressure chamber 6, which is filled with hydraulic medium during operation of the chain drive. The hydraulic medium is generally provided from the general hydraulic medium circuit as motor oil. A slow response in the event of dynamic stress represents a drawback of the hydraulic attenuation. Sudden tightening of the slack span may thus result in excessive stress on the control chain. Pressure relief valve unit 12 mitigates the described effect, and at the same time is used for venting.

Figure 2:
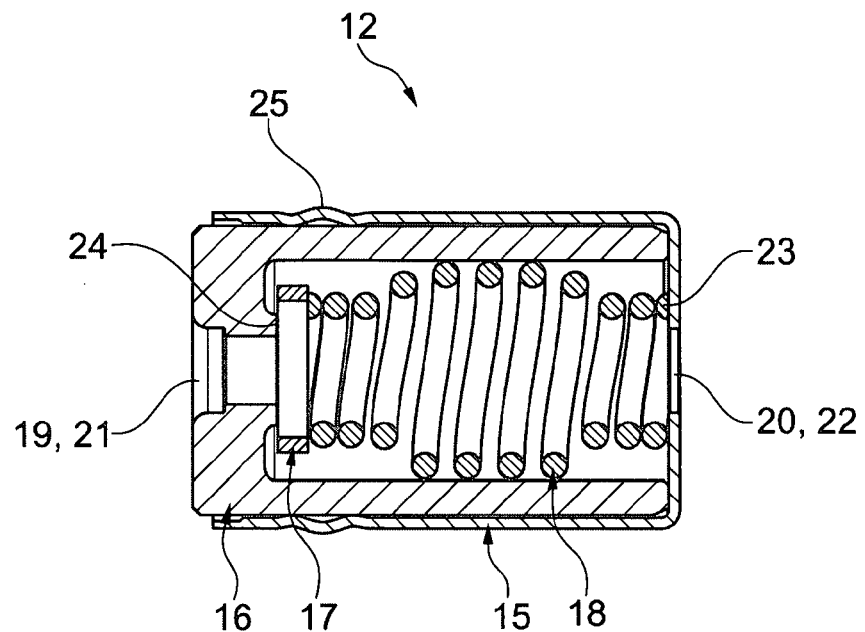
FIG. 2 shows a first specific embodiment of a pressure relief valve unit from FIG. 1.

FIG. 2 shows pressure relief valve unit 12 from FIG. 1 in a longitudinal section as a first specific embodiment. The pressure relief valve unit is made up of a receptacle 15 which accommodates a valve seat 16, a valve plate 17 as a closing body, and a spring 18; a preassemblable unit is formed in this way. The pressure relief valve unit has a recess 19 on valve seat 16, and a further recess 20 on receptacle 15, thus defining an inflow-side end and an outflow-side end 21, 22, respectively, of the pressure relief valve unit. Receptacle 15 forms a spring seat 23 at outflow-side end 22, on which spring 18 is supported. The spring acts with a pretensioning force on valve plate 17, so that the valve plate is supported on a sealing surface 24 of valve seat 16; recess 19 on the valve seat is thus closed, and is opened only in an operating state in which the pressure in the pressure chamber exceeds a predefined value.

Valve seat 16 is made of a metallic material and has a hardened surface. The valve seat is accommodated by receptacle 15 on inflow-side end 21, and on outflow-side end 22 is supported on the receptacle and is almost completely enclosed by same after being accommodated. Receptacle 15 is made of a metallic, nonhardened material, and forms a press fit with the inner circumferential surface of clamping piston 3. Receptacle 15 has profiling 25 along its circumference that extends radially inwardly and radially outwardly, which assists with forming a press fit.

Figure 3:
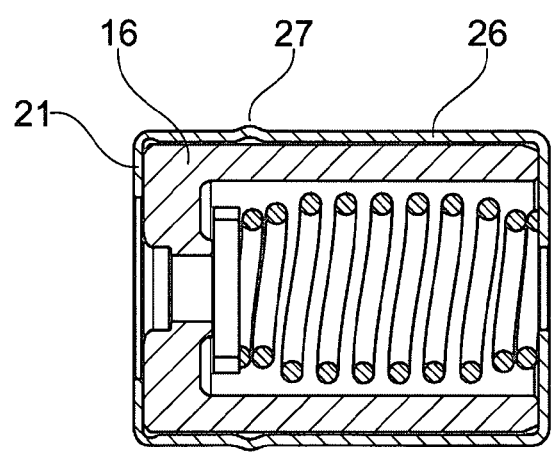
FIG. 3 shows a second specific embodiment of a pressure relief valve not encompassed by the present invention.

A second specific embodiment of a pressure relief valve unit 12, not encompassed by the present invention, is illustrated in FIG. 3 in a longitudinal section. In the specific embodiment shown, valve seat 16 is completely enclosed by receptacle 26. Receptacle 26 and valve seat 16 are crimped at inflow-side end 21 of the pressure relief valve unit. Receptacle 26 has radially outwardly extending profiling 27 along its circumference which assists with forming a press fit with the inner circumferential surface of clamping piston 3.

LIST OF REFERENCE NUMERALS 1 tensioning device
2 housing
3 clamping piston
4 housing bore 5 piston cavity
6 pressure chamber
7 recess
8 recess
9 inflow-side end of the tensioning device
10 outflow-side end of the tensioning device
11 check valve
12 pressure relief valve unit
13 seat for a main spring
14 main spring
15 receptacle
16 valve seat
17 valve plate
18 spring
19 recess
20 recess
21 inflow-side end of the pressure relief valve unit
22 outflow-side end of the pressure relief valve unit
23 spring seat
24 sealing surface
25 profiling of receptacle 15
26 receptacle of a second specific embodiment

The invention claimed is:

1. A hydraulic tensioning device for a chain drive of an internal combustion engine, the hydraulic tensioning device comprising:
a housing;
a clamping piston displaceably guided in a housing bore of the housing, the clamping piston having a piston cavity with at least one hardened inner circumferential surface, the piston cavity together with the housing bore of the housing forming a pressure chamber; and
a pressure relief valve unit situated in the piston cavity, the pressure relief valve unit being a preassemblable unit, and including a spring, a closing body, a valve seat, and a receptacle at least partially enclosing the valve seat, the valve seat being made of a metallic material and at least having an at least partially hardened surface, the receptacle forming a press fit with the inner circumferential surface of the clamping piston, and the receptacle forming a press fit with the valve seat, a portion of the valve seat radially surrounding the spring and being radially between a portion of the receptacle and the spring.

2. The tensioning device as recited in claim 1 wherein the receptacle is made of a plastic or a metallic, nonhardened material.

3. The tensioning device as recited in claim 1 wherein ends of the pressure relief valve unit define an inflow-side end and an outflow-side end, the receptacle at the outflow-side end having a recess and a surface for supporting the spring, and the receptacle accommodating the valve seat via the inflow-side end.

4. The tensioning device as recited in claim 3 wherein the valve seat has a recess and a sealing surface for the closing body on the inflow-side end.

5. The tensioning device as recited in claim 1 wherein the receptacle has a profile extending radially inwardly or radial outwardly along a circumference.

\* \* \* \* \*